United States Patent
Schrader

(10) Patent No.: US 9,692,220 B2
(45) Date of Patent: Jun. 27, 2017

(54) GUIDES FOR AND METHODS OF FORMING A WIRE HARNESS

(71) Applicant: THE BOEING COMPANY, Chicago, IL (US)

(72) Inventor: Matthew F. Schrader, Glenolden, PA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/285,622

(22) Filed: Oct. 5, 2016

(65) Prior Publication Data

US 2017/0047723 A1 Feb. 16, 2017

Related U.S. Application Data

(63) Continuation of application No. 14/825,037, filed on Aug. 12, 2015, now Pat. No. 9,488,297.

(51) Int. Cl.
| | |
|---|---|
| F16L 3/22 | (2006.01) |
| H02G 15/007 | (2006.01) |
| F16L 3/12 | (2006.01) |
| F16L 3/223 | (2006.01) |
| H01B 7/00 | (2006.01) |
| H01B 13/012 | (2006.01) |

(52) U.S. Cl.
CPC .............. *H02G 15/007* (2013.01); *F16L 3/12* (2013.01); *F16L 3/2235* (2013.01); *H01B 7/0045* (2013.01); *H01B 13/01209* (2013.01); *H01B 13/01227* (2013.01)

(58) Field of Classification Search
USPC ........................................... 248/68.1
See application file for complete search history.

(56) References Cited

U.S. PATENT DOCUMENTS

| | | | | |
|---|---|---|---|---|
| 3,044,807 A | * | 7/1962 | Brisse | E04H 12/20 24/134 R |
| 3,736,652 A | | 6/1973 | Fletcher, Jr. | |
| 4,372,511 A | * | 2/1983 | Knowles | G02B 6/4439 248/68.1 |
| 4,704,775 A | | 11/1987 | Cross | |
| 5,399,814 A | * | 3/1995 | Staber | H02G 3/0456 174/135 |
| 6,360,051 B1 | * | 3/2002 | Daoud | G02B 6/3801 385/134 |

(Continued)

FOREIGN PATENT DOCUMENTS

JP 2003312385 A 11/2003

*Primary Examiner* — Monica Millner
(74) *Attorney, Agent, or Firm* — Toler Law Group, PC

(57) ABSTRACT

A guide 100 for a wire harness 610 is disclosed. The guide 100 comprises a first surface 120; a second surface 130, at least a second portion 132 of which is parallel to at least a first portion of the first surface 120; a contoured surface 140 between the first surface 120 and the second surface 130; and a plurality of through, circumferentially enclosed openings 170 extending from the first surface 120 to the second surface 130. The contoured surface 140 has a non-linear central axis 141 parallel to at least the first portion 122 of the first surface 120 and to at least the second portion 132 of the second surface 130. Further, the contoured surface 140 has a concave cross-section 142. The non-linear central axis 141 is curved.

20 Claims, 14 Drawing Sheets

(56) References Cited

U.S. PATENT DOCUMENTS

| | | | |
|---|---|---|---|
| 7,722,001 B2* | 5/2010 | Trotter | F16B 5/0685 |
| | | | 248/65 |
| 8,020,259 B2* | 9/2011 | Ho | F16L 3/222 |
| | | | 24/129 R |
| 8,025,258 B2* | 9/2011 | Eldridge | H02G 3/24 |
| | | | 174/135 |
| 9,488,297 B1* | 11/2016 | Schrader | F16L 3/12 |
| 9,520,705 B2* | 12/2016 | Trifeletti | H02G 13/40 |
| 2003/0015627 A1 | 1/2003 | Van Scoy et al. | |
| 2003/0121692 A1 | 7/2003 | Kato et al. | |
| 2007/0205015 A1 | 9/2007 | Ide | |
| 2007/0246613 A1* | 10/2007 | Kennedy | H02G 3/32 |
| | | | 248/56 |
| 2011/0061895 A1 | 3/2011 | Terada et al. | |
| 2011/0147542 A1* | 6/2011 | Hoek | F16L 3/223 |
| | | | 248/68.1 |
| 2013/0187012 A1* | 7/2013 | Blakeley | H02G 3/32 |
| | | | 248/68.1 |
| 2015/0330552 A1* | 11/2015 | Boyanich | F16L 3/133 |
| | | | 248/62 |

* cited by examiner

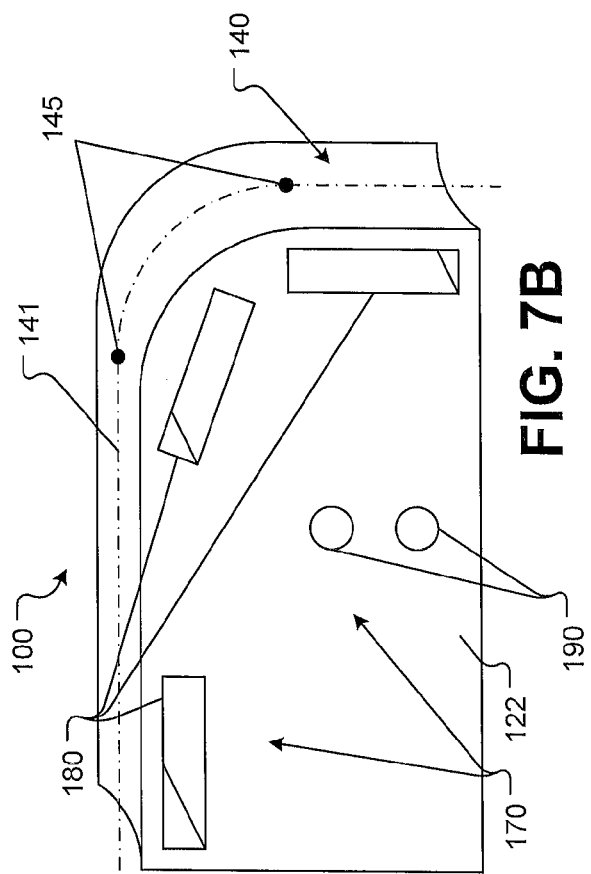
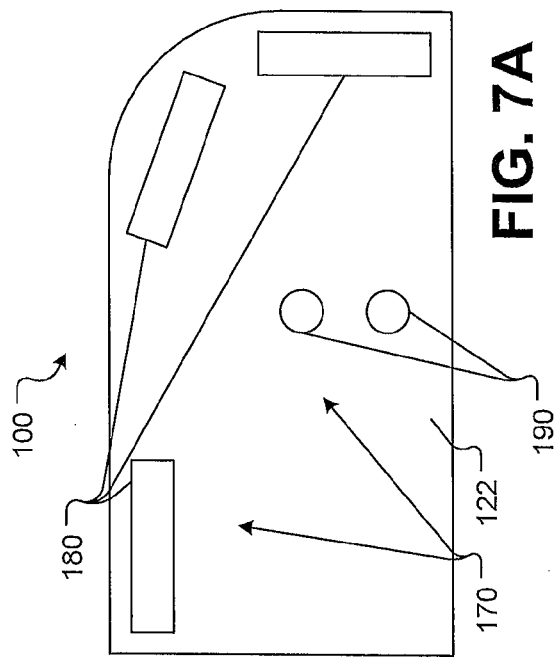
FIG. 7A
FIG. 7B

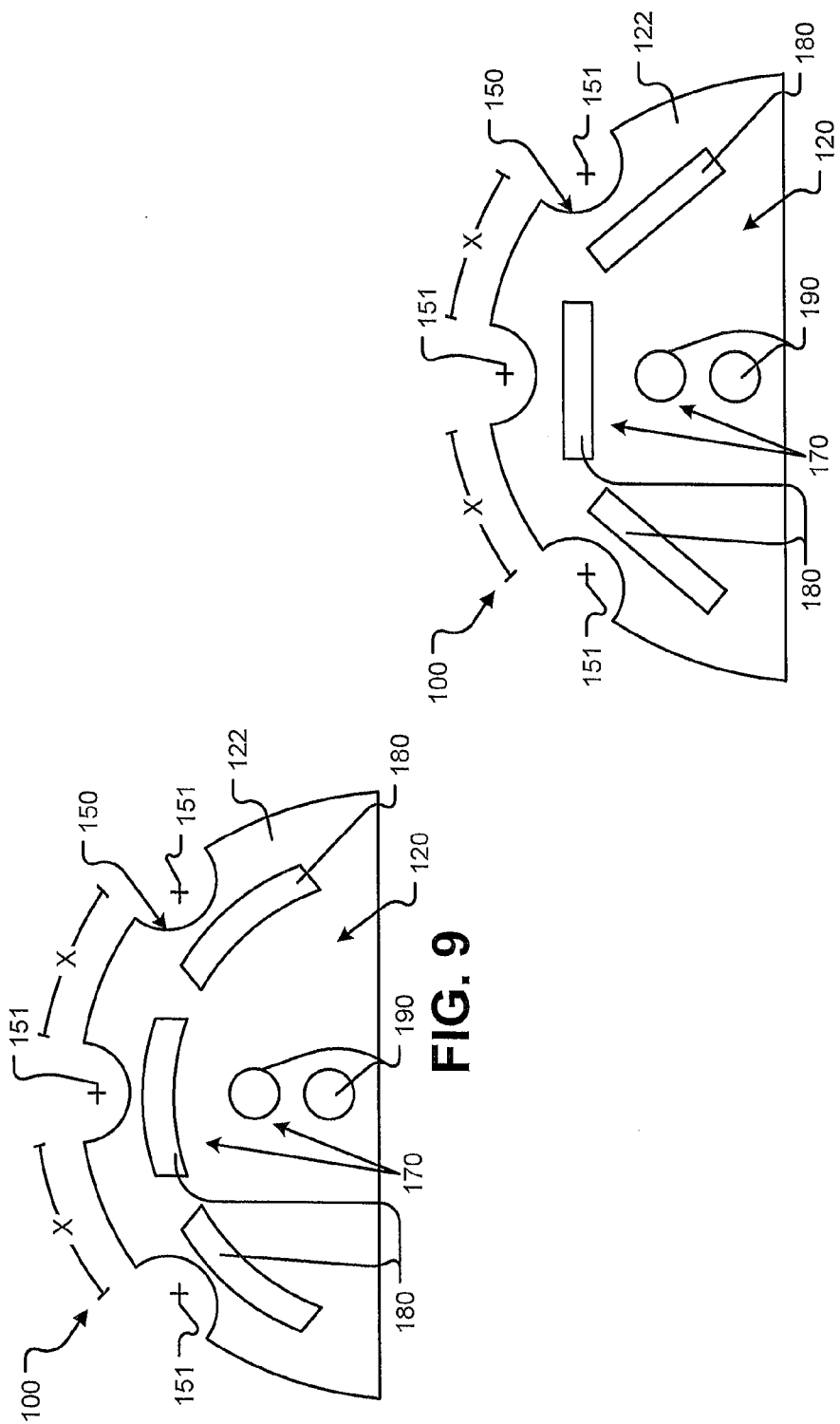

GUIDES FOR AND METHODS OF FORMING A WIRE HARNESS

CROSS-REFERENCE TO RELATED APPLICATIONS

This application claims priority from and is a continuation of U.S. patent application Ser. No. 14/825,037, entitled "GUIDES FOR AND METHODS OF FORMING A WIRE HARNESS," filed Aug. 12, 2015, the entire contents of which are expressly incorporated herein by reference.

BACKGROUND

For optimum service life, wiring (e.g., coaxial, fiber optic, or other types) should be installed according to manufacturer's design specifications. However, during manufacture, transportation, or installation, wires may be prone to damage, misalignment, and creep (or elongation). The wires may also deviate from a specified bend radius or curvature, and accordingly have improper fitment. Further, when the wires are not properly configured to specifications, installation of the wires in tight spaces may be problematic and may damage the wires. When confronted with such problems, the operator typically interrupts the installation process to undertake time-consuming and costly wire repositioning and/or repairs.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the present disclosure relates to a guide for a wire harness. The guide comprises a first surface and a second surface, at least a second portion of which is parallel to at least a first portion of the first surface. The guide also comprises a contoured surface between the first surface and the second surface as well as a plurality of through, circumferentially enclosed openings, extending from the first surface to the second surface. The contoured surface has a non-linear central axis parallel to at least the first portion of the first surface and to at least the second portion of the second surface. The contoured surface also has a concave cross-section.

Another example of the present disclosure relates to a system comprising a guide and a wire harness. The guide comprises a first surface and a second surface, at least a second portion of which is parallel to at least a first portion of the first surface. The guide also comprises a contoured surface between the first surface and the second surface as well as a plurality of through, circumferentially enclosed openings extending from the first surface to the second surface. The contoured surface has a non-linear central axis parallel to at least the first portion of the first surface and to at least the second portion of the second surface. The contoured surface also has a concave cross-section. The wire harness comprises wires that are routed along the contoured surface of the guide.

Yet another example of the present disclosure relates to a method of forming a wire harness. The method comprises coupling a guide to a form board such that a non-linear central axis of a contoured surface of the guide is parallel to the form board and the guide is not rotatable relative to the form board and routing wires along the contoured surface of the guide to form a bend in the wires.

BRIEF DESCRIPTION OF THE DRAWINGS

Figure 1:
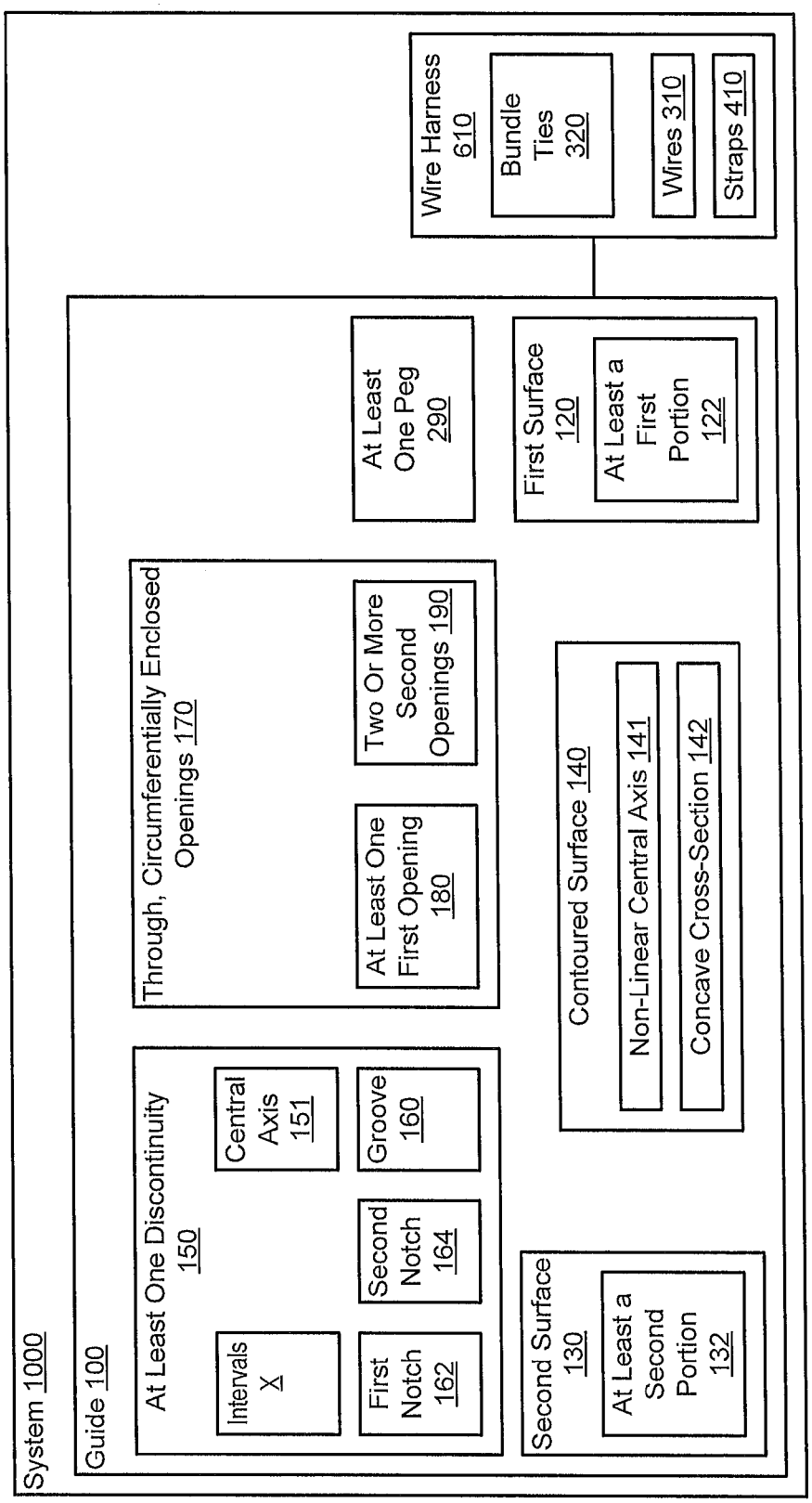

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a block diagram of a system that includes a guide and a wire harness, according to one or more examples of the present disclosure.

Figures 2A, 2B, 2C, 2D:
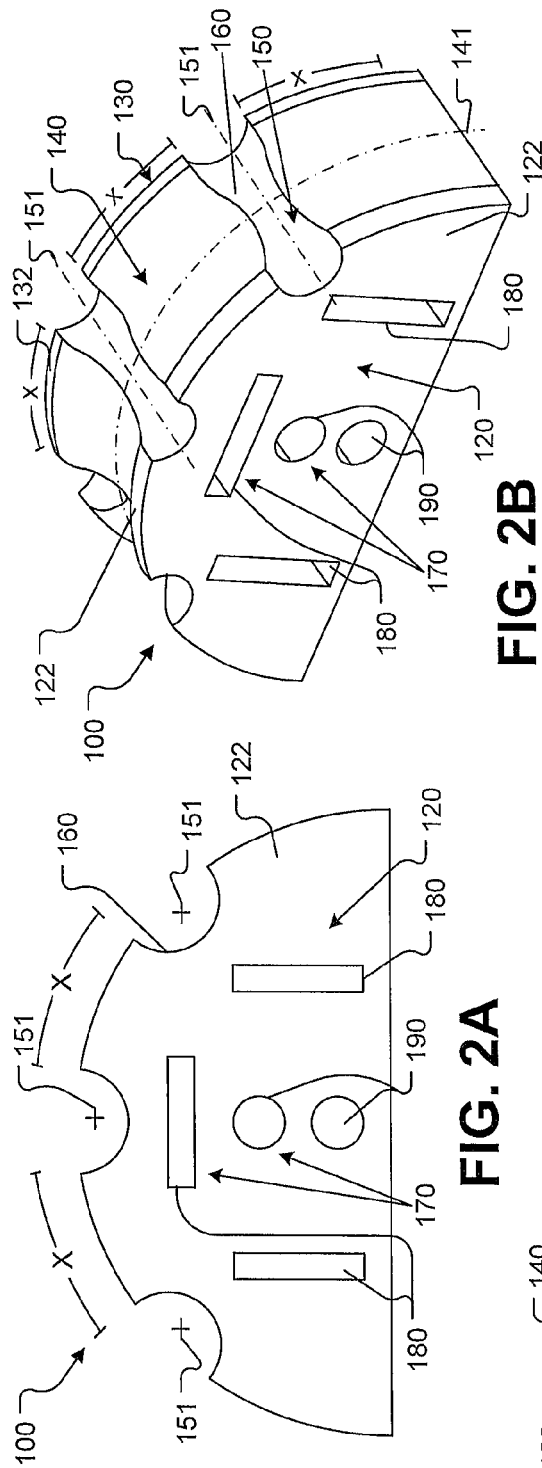
Figure 3:
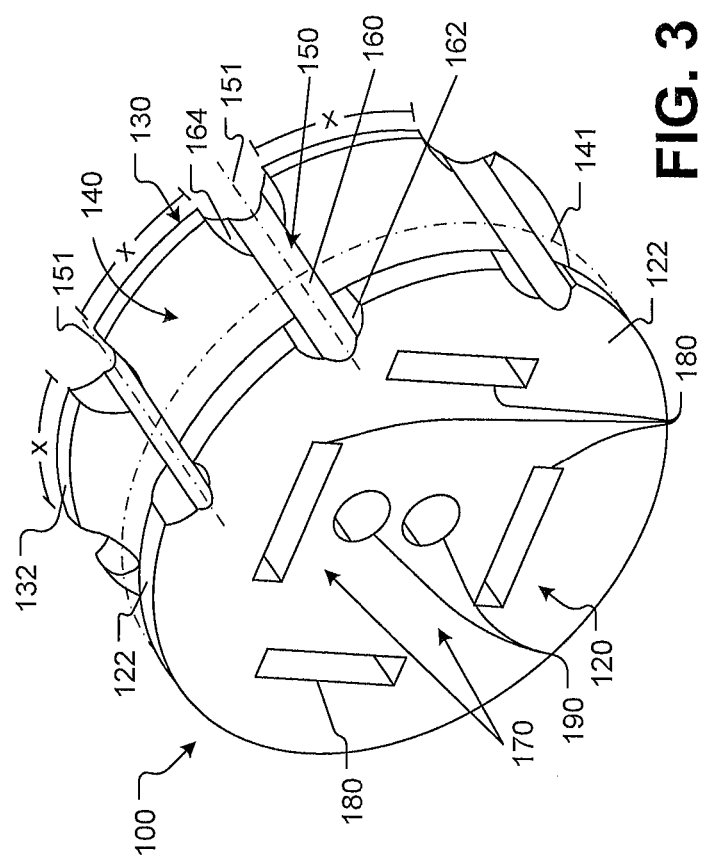
Figure 4:
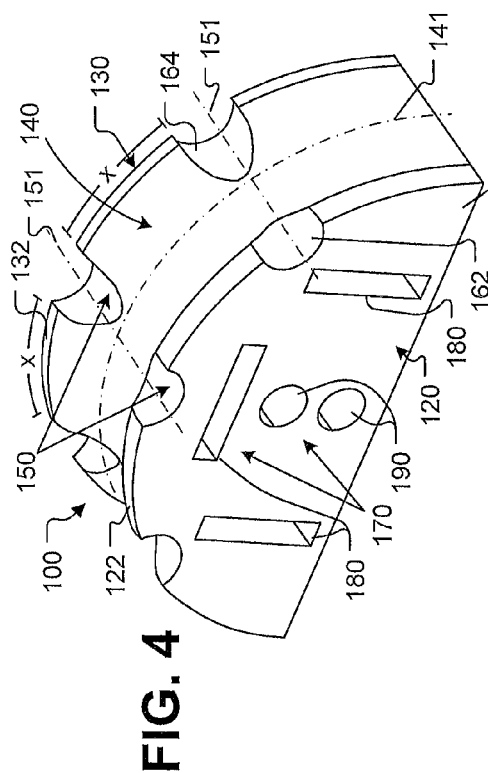
Figure 6:
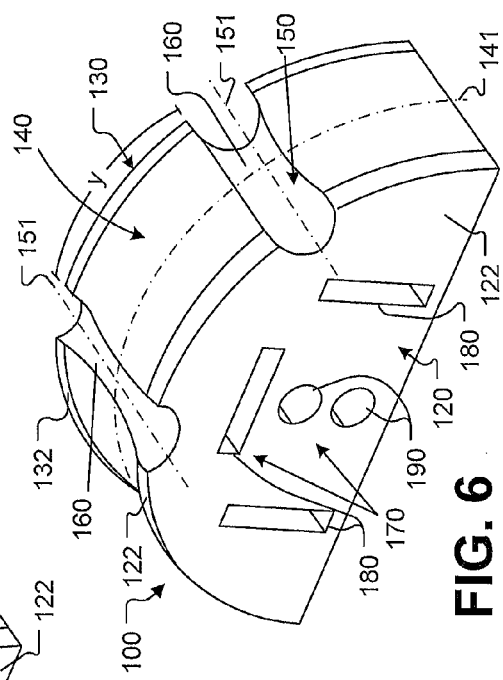
Figure 5:
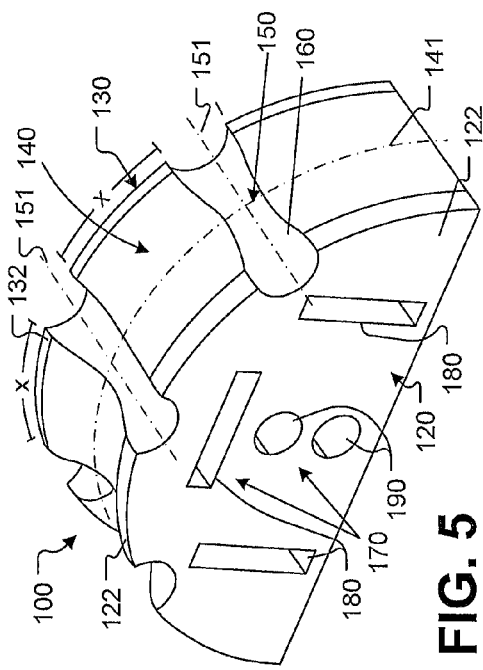
Figure 8A:
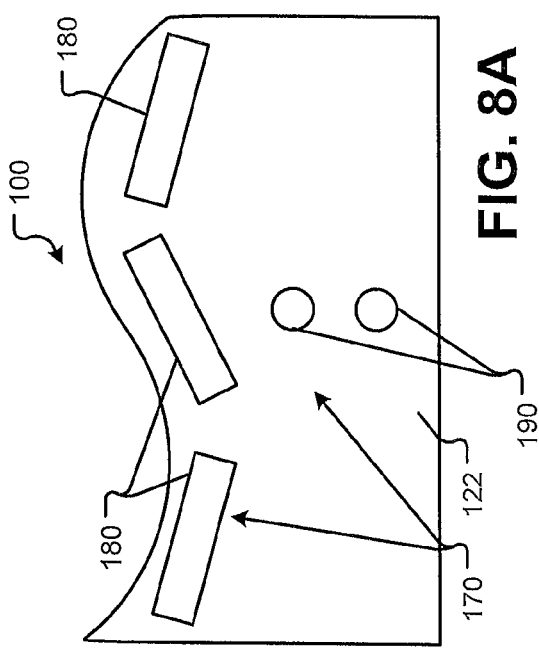
Figure 8B:
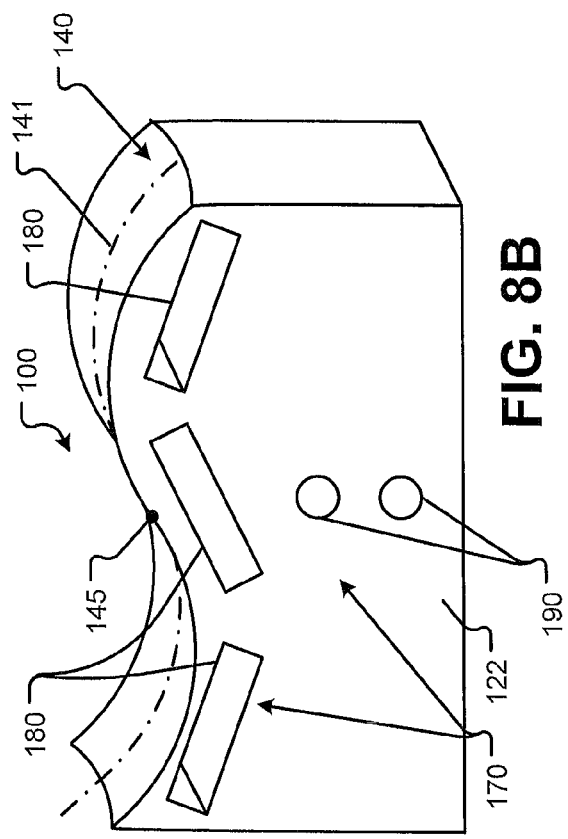
Figure 11A:
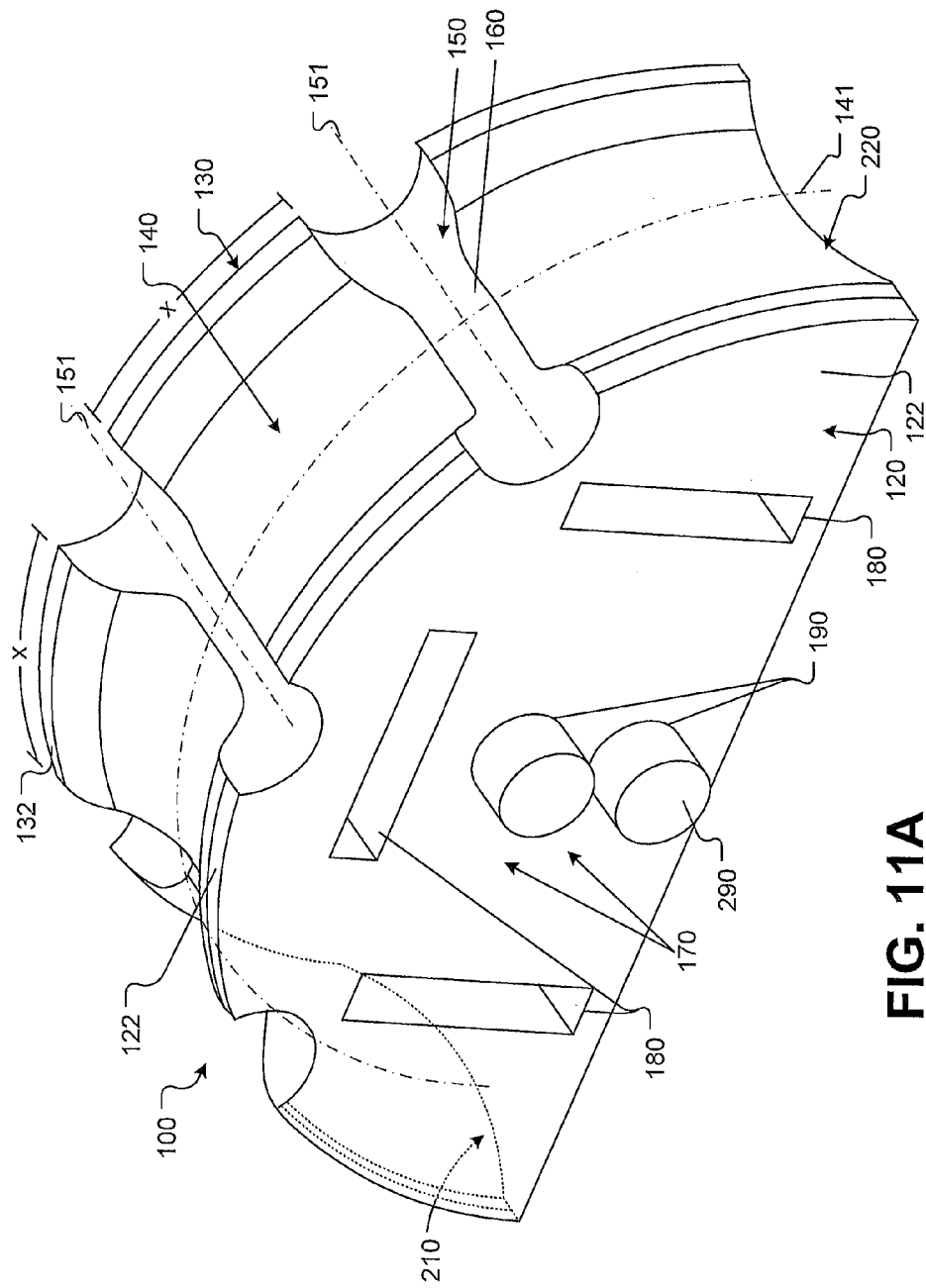
Figure 11B:
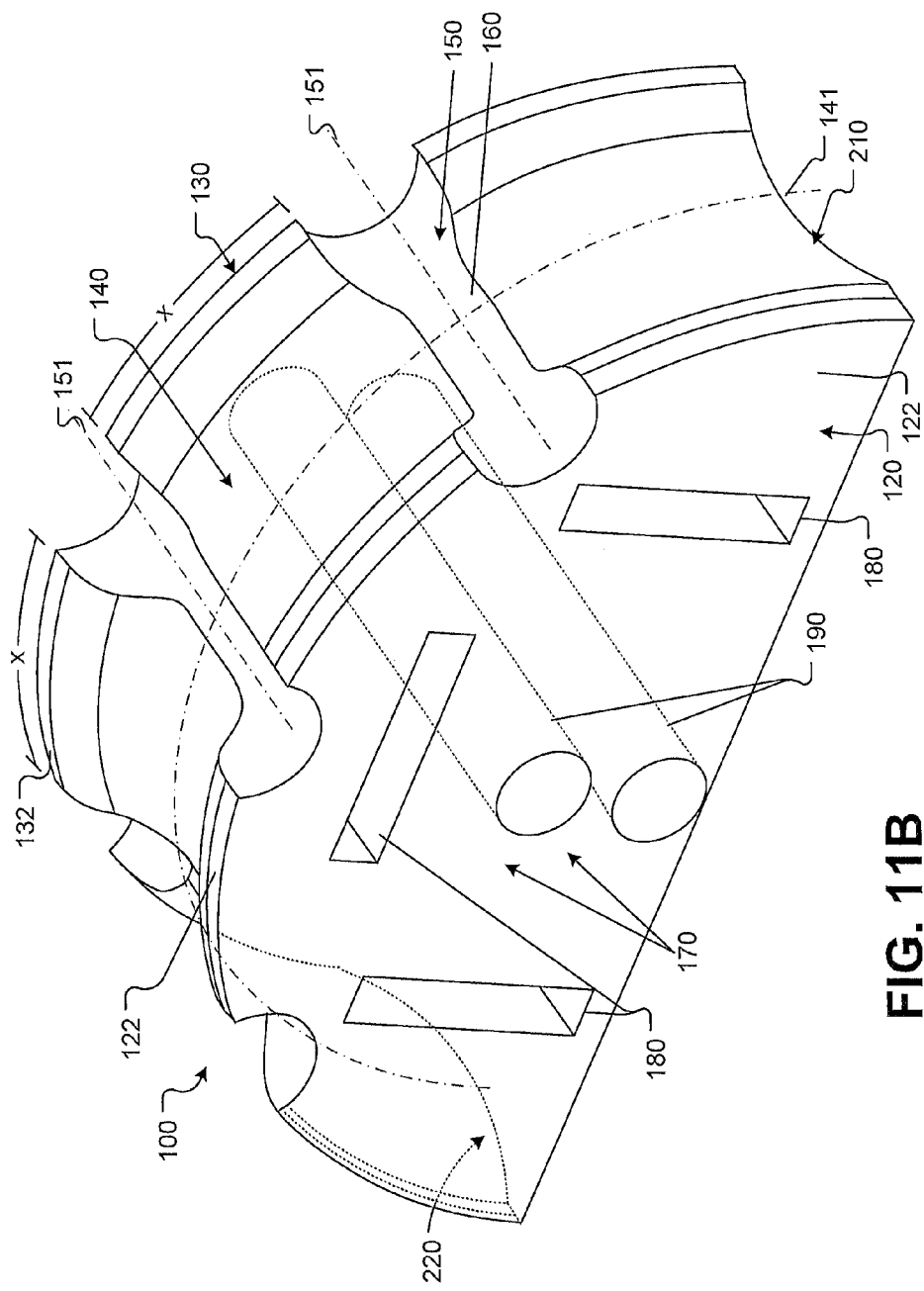
Figure 12:
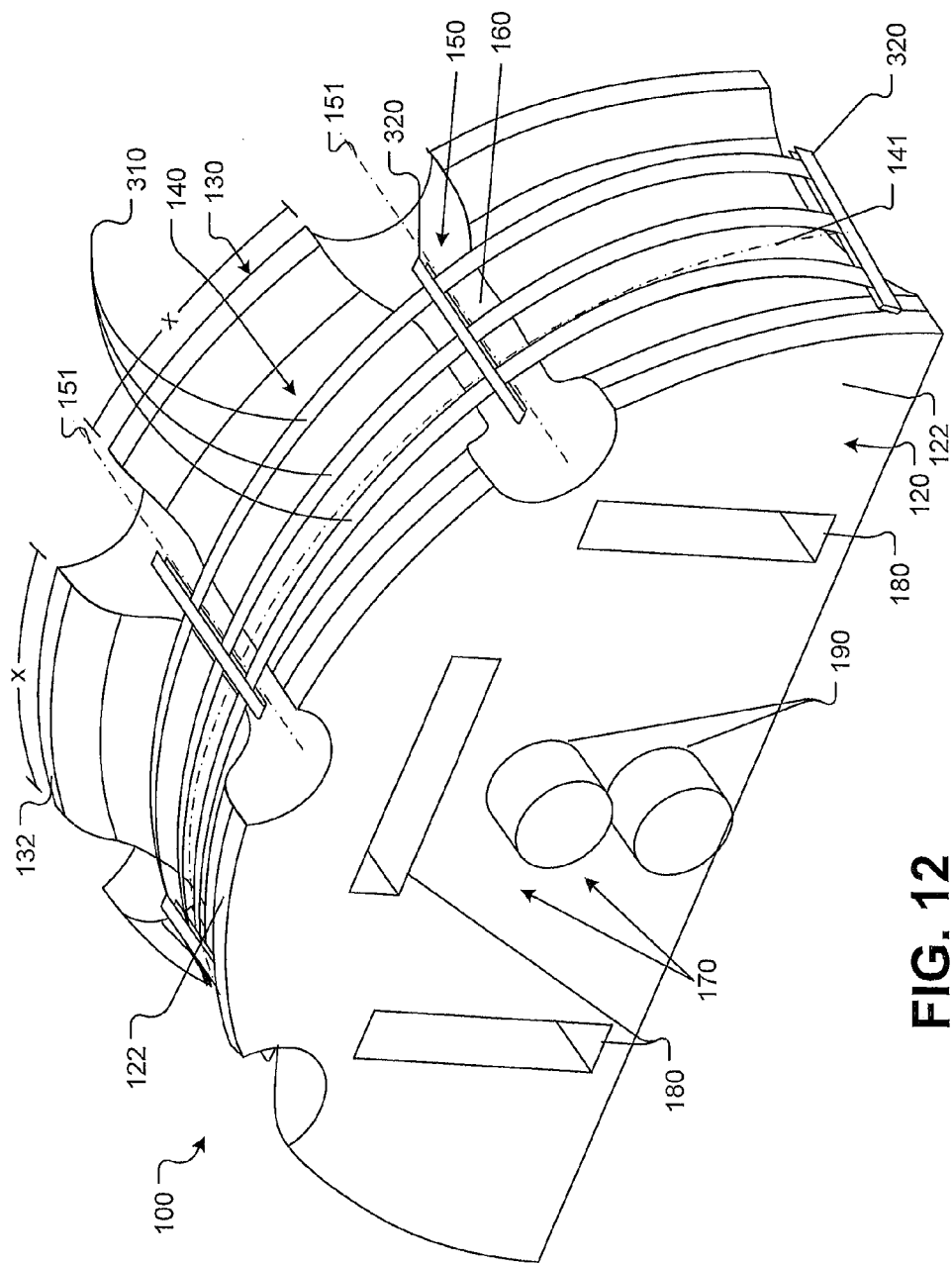
Figure 13:
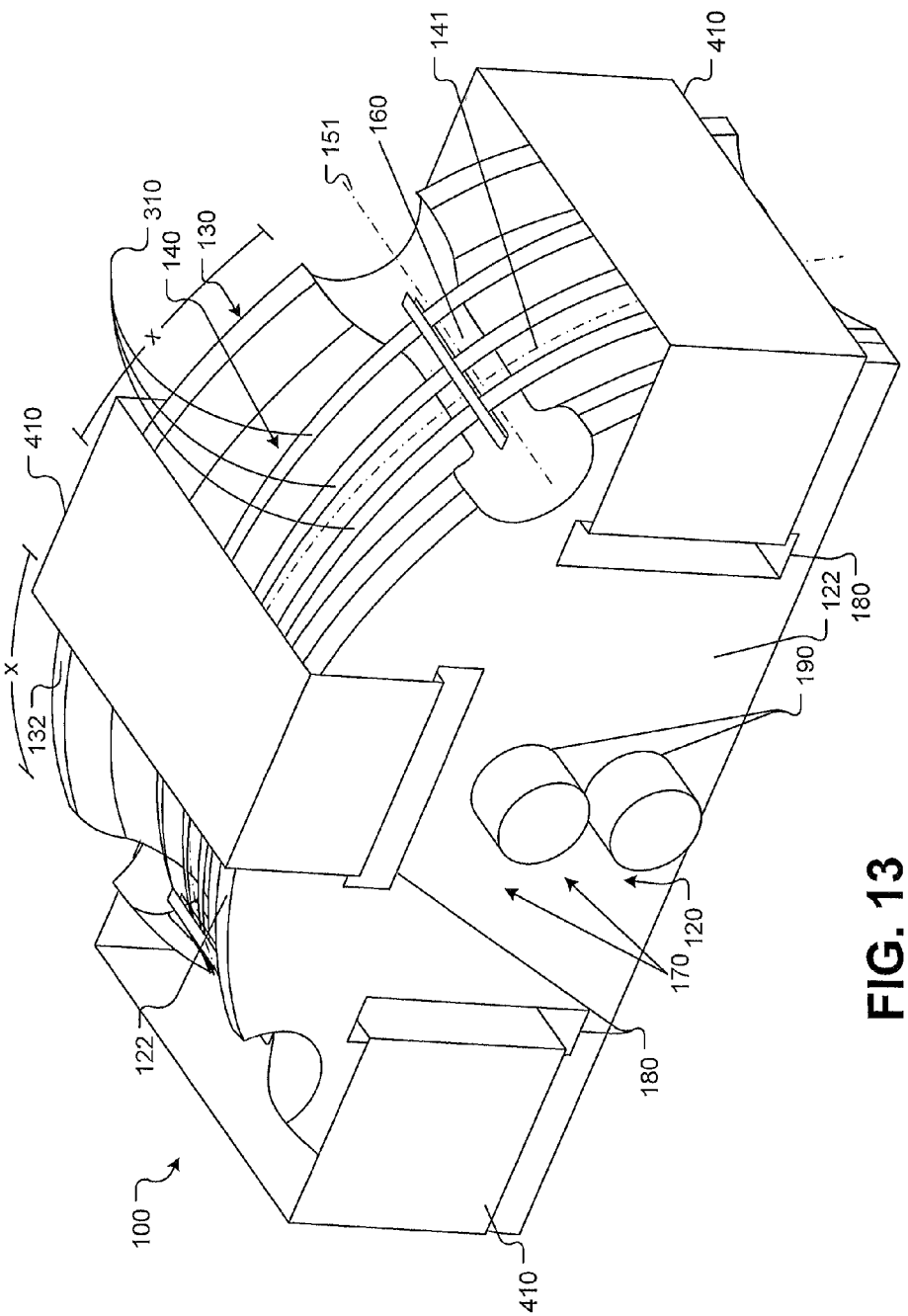
Figure 14:
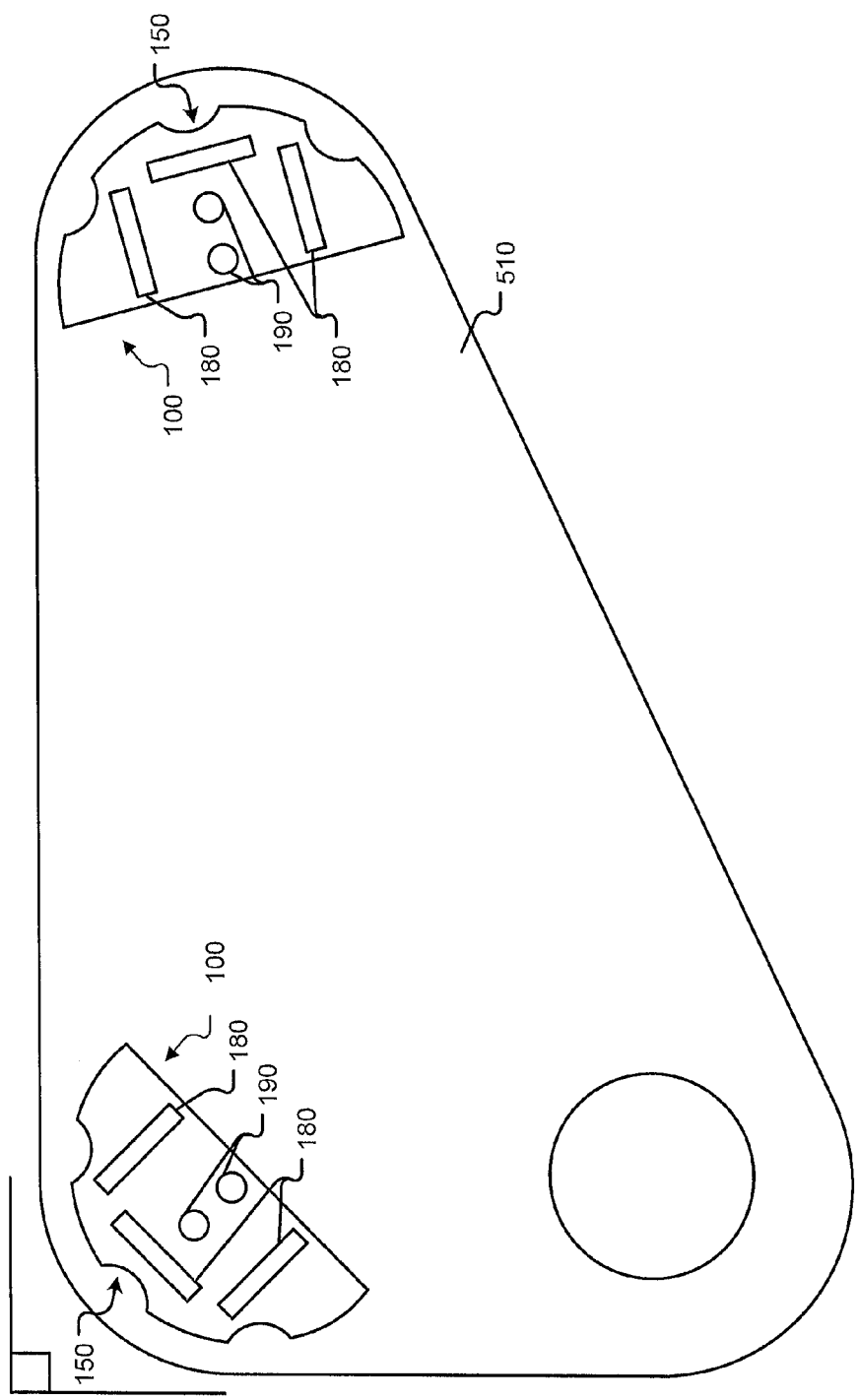
Figure 15:
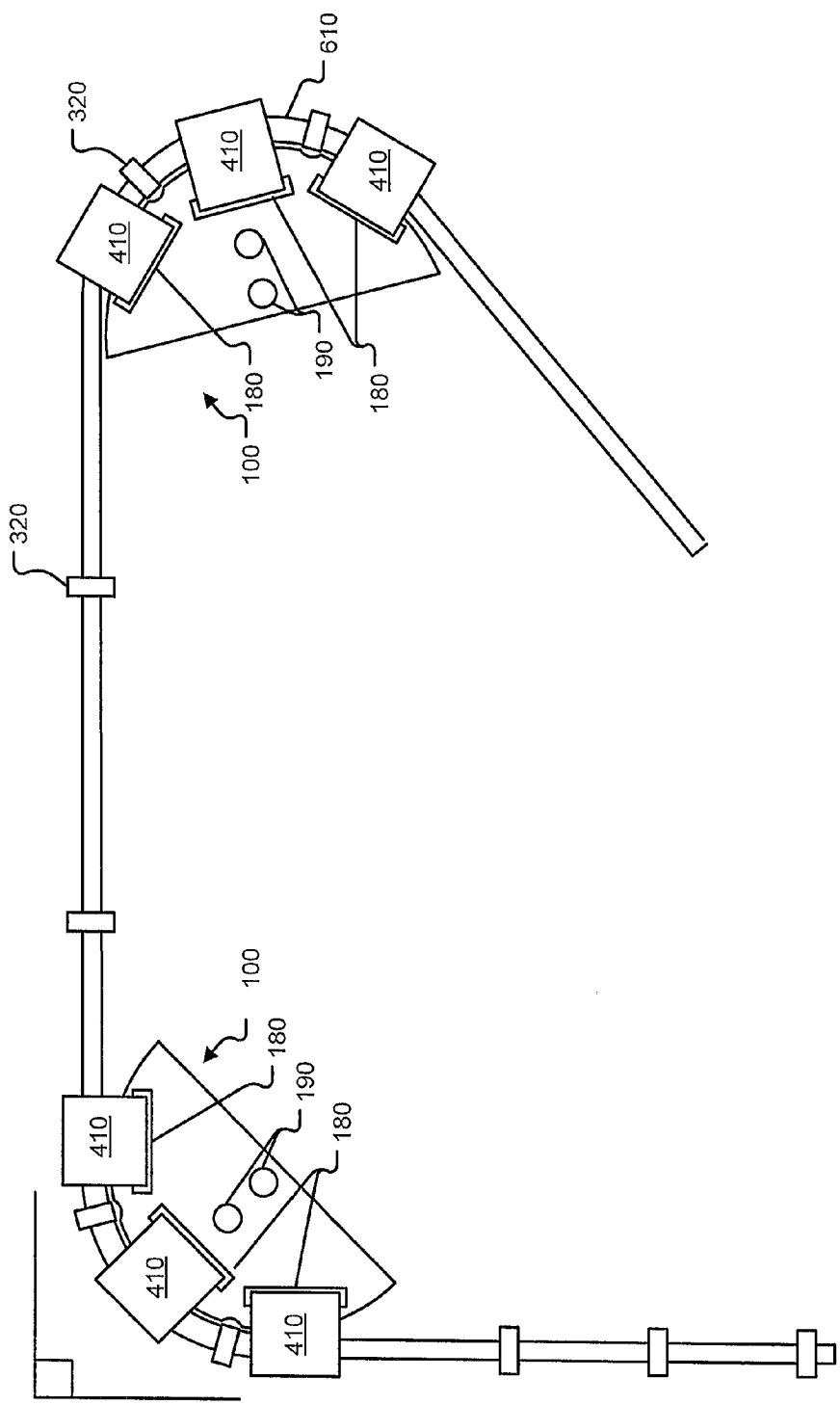
Figure 16:
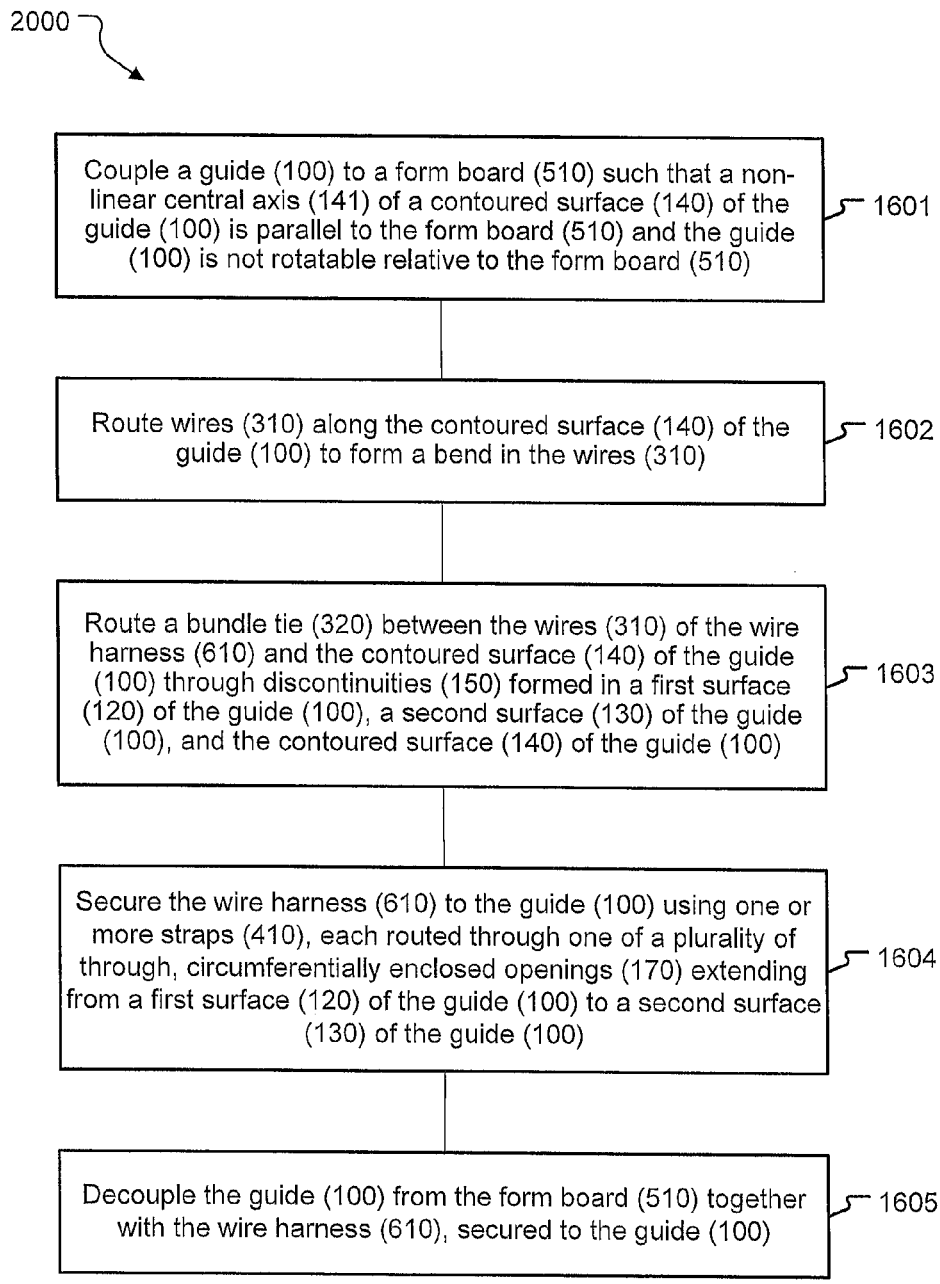

FIG. 2A is a schematic front view of the guide of FIG. 1, according to one or more examples of the present disclosure;

FIG. 2B is a schematic perspective view of the guide of FIG. 1, according to one or more examples of the present disclosure;

FIG. 2C is a schematic side view of the guide of FIG. 1, according to one or more examples of the present disclosure;

FIG. 2D is a schematic top view of the guide of FIG. 1, according to one or more examples of the present disclosure;

FIG. 3 is a schematic perspective view of the guide of FIG. 1, according to one or more examples of the present disclosure;

FIG. 4 is a schematic perspective view of the guide of FIG. 1, according to one or more examples of the present disclosure;

FIG. 5 is a schematic perspective view of the guide of FIG. 1, according to one or more examples of the present disclosure;

FIG. 6 is a schematic perspective view of the guide of FIG. 1, according to one or more examples of the present disclosure;

FIG. 7A is a schematic side view of the guide of FIG. 1, according to one or more examples of the present disclosure;

FIG. 7B is a schematic perspective view of the guide of FIG. 1, according to one or more examples of the present disclosure;

FIG. 8A is a schematic side view of the guide of FIG. 1, according to one or more examples of the present disclosure;

FIG. 8B is a schematic perspective view of the guide of FIG. 1, according to one or more examples of the present disclosure;

FIG. 9 is a schematic side view of the guide of FIG. 1, according to one or more examples of the present disclosure;

FIG. 10 is a schematic side view of the guide of FIG. 1, according to one or more examples of the present disclosure;

FIG. 11A is a schematic front perspective view of the guide of FIG. 1, according to one or more examples of the present disclosure;

FIG. 11B is a schematic rear perspective view of the guide of FIG. 1, according to one or more examples of the present disclosure;

FIG. 12 is a schematic perspective view of the guide and the wire harness of FIG. 1, according to one or more examples of the present disclosure;

FIG. 13 is a schematic perspective view of the guide and the wire harness of FIG. 1, according to one or more examples of the present disclosure;

FIG. 14 is a schematic top view of two guides of FIG. 1, according to one or more examples of the present disclosure, affixed to a form board;

FIG. 15 is a schematic top view of the system of FIG. 1, according to one or more examples of the present disclosure; and FIG. 16 is a block diagram of a method of forming a wire harness, according to one or more examples of the present disclosure.

DETAILED DESCRIPTION

In FIG. 1, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual imaginary elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIG. 16, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 16 and the accompanying disclosure describing the operations of the methods set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according the present disclosure are provided below.

In one or more examples of the present disclosure, which may or may not be claimed, guide 100, system 1000, and method 2000 promote low cost, efficient, and correct manufacturing, transportation, and installation of wires. With better fitment, fewer repairs are necessary, less time is required for adjustment of wires, and less wire creep (or wire elongation) occurs, enabling an operator to save both time and money. Also, guide 100, system 1000, and method 2000 increase a likelihood of wires maintaining desired wire bends. Further, guide 100, system 1000, and method 2000 utilize low cost and lightweight materials. A manufacturer, thus, may save on the costs related to weight instead of requiring numerous brackets to maintain a certain bend radius. Moreover, additional savings may be realized by less waste produced.

Referring generally to FIG. 1 and particularly to, e.g., FIGS. 2A-2D, 3, 4, 5, 6, 7A-7B, 8A-8B, 9, 10, 11A-B, 12, and 13, guide 100 for wire harness 610 is disclosed. Guide 100 comprises first surface 120 and second surface 130, at least second portion 132 of which is parallel to at least first portion 122 of first surface 120. Guide 100 further comprises contoured surface 140 between first surface 120 and second surface 130 as well as plurality of through, circumferentially enclosed openings 170, extending from first surface 120 to second surface 130. Contoured surface 140 has non-linear central axis 141 parallel to at least first portion 122 of first surface 120 and to at least second portion 132 of second surface 130. Contoured surface 140 also has a concave cross-section 142. The preceding subject matter of this paragraph characterizes example 1 of the present disclosure.

Contoured surface 140 provides frame support upon which wires 310 of wire harness 610 may be positioned such that a particular desired bend (i.e., bend radius or curvature of wires 310) is maintained during manufacturing, transportation, and installation of wires 310 (or wires 310 and guide 100). Contoured surface 140 resists lateral displacement of wires 310 (e.g., from one side of guide 100 that is closer to first surface 120 to another side of guide 100 that is closer to second surface 130).

Parallel first and second portions 122, 132 of first and second surfaces 120, 130 provide planar alignment of guide 100 with a flat surface, such as that of form board 510. Such planar alignment is important for aligning the wires 310 when multiple guides 100 are coupled to form board 510, or other structure, to route wires 310.

Plurality of through, circumferentially enclosed openings 170 provides different arrangements to secure wires to guide 100 and/or to secure guide 100 to a flat surface, such as that of form board 510.

Advantageously, guide 100 enables manufacturing, transportation, and/or installation of the wires, or wires and guide 100, to be achieved according to design parameters and specifications.

As mentioned herein, the term "parallel", as applied to lines and/or surfaces, shall be defined as lines and/or surfaces progressing so that the interval between them remains the same, within an applicable manufacturing tolerance. For example, second portion 132 being parallel to first portion 122 means that second portion 132 and first portion 122 are included in respective geometric planes that are parallel in space, within an applicable manufacturing tolerance. Furthermore, in one or more examples of the present disclosure, the bend formed by wires 310 may be curved, e.g., circular or compound or segmented.

Non-linear central axis 141 is coincident to at least first portion 122 of first surface 120 and to at least second portion 132 of second surface 130 and follows the bend or curvature in which wires 310 of wire harness 610 are positioned.

As used herein, a "central axis" of an object, such as a non-planar surface or a surface having circumferentially closed cross-sections, is a line, which may or may not be straight, passing through the centroid of each cross-section of the object that is perpendicular to the medial skeleton of the object. A medial skeleton of an object is a set of points not on the object's boundary such that at least two points on the object's boundary are equidistant from and closest to each point of the set of points. The centroid (geometric center) of a two-dimensional region, such as a cross-section of an object, is the "average" position of all the points in the two-dimensional region. As used herein, "non-linear" is defined as not denoting, involving, or arranged in a straight line and incorporates any non-straight line or non-straight portion of a line. For instance, non-linear central axis 141, in one or more examples, can include any angle that is not 180 degrees (e.g., a relatively sharp bend of 90 degrees).

Referring generally to FIG. 1 and particularly to, e.g., to FIGS. 7A-7B and 8A-8B, non-linear central axis 141 of contoured surface 140 comprises an inflection point 145. The preceding subject matter of this paragraph characterizes example 2 of the present disclosure, wherein example 2 also includes the subject matter according to example 1, above.

Providing inflection point 145 on non-linear central axis 141 of contoured surface 140 enables guide 100 to impart a complex curvature to wires 310 positioned on contoured surface 140.

For purposes of this disclosure, an "inflection point" is defined as a transition point between a concave portion and a convex portion, a concave portion and a straight portion, or a convex portion and a straight portion of a line.

Referring generally to FIG. 1 and particularly to e.g., FIGS. 2A-2D, 3, 4, 5, 6, 7A-7B, 8A-8B, 9, 10, 11A-11B, 12, 13, 14, and 15, non-linear central axis 141 of contoured surface 140 is curved. The preceding subject matter of this paragraph characterizes example 3 of the present disclosure, wherein example 3 also includes the subject matter according to any one of examples 1 or 2, above.

The curvature of non-linear central axis 141 of contoured surface 140 enables a local bend to be imparted to wires 310. In some implementations, multiple guides 100 can be used to route wires 310 in various directions within a designated area.

Referring generally to FIG. 1 and particularly to, e.g., FIG. 3, non-linear central axis 141 of contoured surface 140 forms a closed shape. The preceding subject matter of this paragraph characterizes example 4 of the present disclosure, wherein example 4 also includes the subject matter according to any one of examples 1-3, above.

For purposes of this disclosure, non-linear central axis 141 forms a "closed shape" when a configuration of a bend in wires 310 forming wire harness 610 is greater than 180 degrees (e.g., a complete circle, as an illustrative non-limiting example).

A closed shape of non-linear central axis 141 facilitates the bend in wires 310 along the circumference of guide 100 when the required bend of wires 310 is greater than 180 degrees, according to one or more examples of the present disclosure. In some examples, a closed shape of non-linear central axis 141 enables a closer fit of wires 310 around contoured surface 140 of guide 100. In some implementations, the closed shape of non-linear central axis 141 allows wires 310 to fully wrap around guide 100 in formation of wire harness 610.

Referring generally to FIG. 1 and particularly to, e.g., FIGS. 2A-2D, 4, 5, 6, 7A-7B, 8A-8B, 9, 10, 11A-11B, 12, 13, 14, and 15, non-linear central axis 141 of contoured surface 140 forms an open shape. The preceding subject matter of this paragraph characterizes example 5 of the present disclosure, wherein example 5 also includes the subject matter according to any one of examples 1-3, above.

For purposes of this disclosure, non-linear central axis 141 forms an "open shape" when a configuration of a bend in wires 310 forming wire harness 610 is less than or equal to 180 degrees (e.g., a semicircle, as an illustrative non-limiting example).

An open shape of non-linear central axis 141 of contoured surface 140 facilitates the bend in wires 310 along the circumference of guide 100 when the bend in wires 310 is less than or equal to 180 degrees, according to one or more examples of the present disclosure. In some examples, the open shape may enable guide 100 to be of smaller size and less weight than a guide having a closed shape, providing conservation of space and weight e.g., when wire harness 610 is transported together with at least one guide 100.

In particular examples, wire harness 610 may be formed using guides 100 having only open shapes, guides 100 having only closed shapes, or a combination thereof, depending on design requirements and space constraints associated with forming, transporting, and/or installing wires 310, wire harness 610, or both.

Referring generally to FIG. 1 and particularly to, e.g., FIGS. 2A-2D, 3, 4, 5, 6, 7A-7B, 8A-8B, 9, 10, 11A-11B, 12, 13, 14, and 15, plurality of through, circumferentially enclosed openings 170 comprises at least one first opening 180 and two or more second openings 190. At least one first opening 180 has a first cross-sectional shape in a plane containing non-linear central axis 141. Two or more second openings 190 each have a second cross-sectional shape in the plane containing non-linear central axis 141. The first cross-sectional shape is different from the second cross-sectional shape. The preceding subject matter of this paragraph characterizes example 6 of the present disclosure, wherein example 6 also includes the subject matter according to any one of examples 1-5, above.

At least one first opening 180 and two or more second openings 190 provide different arrangements to secure wires 310 to guide 100 and/or to secure guide 100 to various structures or support surfaces (e.g., form board 510). In one or more examples of the present disclosure, at least one first opening 180 is at least one slot configured to accommodate at least one strap 410 (e.g., band, belt, leash, cable tie, etc.) to secure wires 310, or wire harness 610, to guide 100. Once wires 310 are secured to guide 100 in the aforementioned manner, a desired wire curvature is maintained and less wire creep relative to guide 100 is observed.

Referring generally to FIG. 1 and particularly to, e.g., FIGS. 2A-2D, 3, 4, 5, 6, 7A-7B, 8A-8B, 9, 10, 11A-11B, 12, 13, 14, and 15, the first cross-sectional shape of at least one first opening 180 is an elongated shape. The preceding subject matter of this paragraph characterizes example 7 of the present disclosure, wherein example 7 also includes the subject matter according to example 6, above.

At least one first opening 180 having an elongated shape enables straps 410 to remain taut, firm, and/or flat within at least one first opening 180. When straps 410 are taut, firm, and/or flat, curvature of wires 310 relative to guide 100 is maintained and less wire creep with respect to guide 100 is observed.

As used herein, "elongated shape" shall mean any shape conducive to accommodating any type of strap, band, belt, and/or leash that may be rectangular or may have rounded ends, e.g., a milled slot.

Referring generally to FIG. 1 and particularly to, e.g., FIGS. 2A-2D, 3, 4, 5, 6, 7A-7B, 8A-8B, 9, 10, 11A-11B, 12, 13, 14, and 15, the second cross-sectional shape of each of two or more second openings 190 is a circular shape. The preceding subject matter of this paragraph characterizes example 8 of the present disclosure, wherein example 8 also includes the subject matter according to any one of examples 6 or 7, above.

In one or more examples, two or more second openings 190 having circular cross-sectional shape are peg holes configured to accommodate pegs 290 to anchor guide 100 to form board 510, for example, or to another similar structure. In other examples, two or more second openings 190 may be used to affix guide 100 to various structures for proper installation of wires 310.

Referring generally to FIG. 1 and particularly to, e.g., FIGS. 2A-2D, 3, 4, 5, 6, 7A-7B, 8A-8B, 10, 11A-11B, 12, 13, and 14, at least one first opening 180 is parallel to a line tangent to non-linear central axis 141. The preceding subject matter of this paragraph characterizes example 9 of the present disclosure, wherein example 9 also includes the subject matter according to any one of examples 6-8, above.

At least one first opening 180 being parallel to a line tangent to non-linear central axis 141 (e.g., a straight slot) enables optimal positioning of straps 410 relative to guide 100 for securing wires 310. At least one first opening 180 being parallel to a line tangent to non-linear central axis 141 further promotes a tighter binding of wires 310 to guide 100.

An illustrative non-limiting example of at least one first opening 180 being parallel to a line tangent to non-linear central axis 141 is shown in FIG. 10. In particular, FIG. 10 depicts three first openings 180, and the elongated sides of each of first openings 180 are parallel to respective lines tangent to non-linear central axis 141.

In some examples, as shown in FIGS. 7A-B and 8A-8B, to promote a tighter binding of wires 310 by straps 410, the positioning of at least one first opening 180 may vary based on the shape formed by contoured surface 140 of guide 100.

Referring generally to FIG. 1 and particularly to, e.g., FIGS. 9 and 15, at least one first opening 180 is parallel to non-linear central axis 141. The preceding subject matter of this paragraph characterizes example 10 of the present disclosure, wherein example 10 also includes the subject matter according to any one of examples 6-8, above.

When used with multiple straps 410 (e.g. cable ties), for example, at least one first opening 180 being parallel to non-linear central axis 141 (e.g., a curved slot) enables a greater conformance of straps 410 to the bend of wires 310 and curvature of guide 100, to promote better conformance of wires 310 to the curvature of guide 100.

An illustrative non-limiting example of at least one first opening 180 being parallel to non-linear central axis 141 is shown in FIG. 9. In particular, FIG. 9 depicts three first openings 180, and the elongated, arc-shaped sides of each of first openings 180 are parallel to non-linear central axis 141.

Referring generally to FIG. 1 and particularly to, e.g., FIGS. 2A-2D, 3, 4, 5, 6, 7A-7B, 8A-8B, 9,10, 11A-11B, 12, 13, 14, and 15, at least a portion of at least one first opening 180 is closer to non-linear central axis 141 than at least a portion of any one of two or more second openings 190. The preceding subject matter of this paragraph characterizes example 11 of the present disclosure, wherein example 11 also includes the subject matter according to any one of examples 6-10, above.

At least a portion of at least one first opening 180 being closer to non-linear central axis 141 than at least a portion of any one of two or more second openings 190 promotes proper securing of wires 310 to guide 100, decreases the possibility of interference of the pegs of form board 510 in the formation and positioning of wire harness 610, and promotes the intended exact placement of wires 310. At least a portion of at least one first opening 180 being closer to non-linear central axis 141 than at least a portion of any of two or more second openings 190 also enables use of a shorter strap 410 to secure wires 310 to guide 100.

Referring generally to FIG. 1 and particularly to, e.g., FIGS. 2A-2D, 3, 4, 5, 6, 7A-7B, 8A-8B, 9, 10, 11A-11B, 12, 13, 14, and 15, all portions of at least one first opening 180 are closer to non-linear central axis 141 than all portions of any one of two or more second openings 190. The preceding subject matter of this paragraph characterizes example 12 of the present disclosure, wherein example 12 also includes the subject matter of any one of examples 6-10, above.

All portions of at least one first opening 180 being closer to non-linear central axis 141 than all portions of any one of two or more second openings 190 promotes proper securing of wires 310 to guide 100, prevents interference of the pegs of form board 510 in the formation and positioning of wire harness 610, and promotes the intended exact placement of wires 310. All portions of at least one first opening 180 being closer to non-linear central axis 141 than all portions of any one of two or more second openings 190 also enables use of a shorter strap 410 to secure wires 310 to guide 100 and prevents interference between strap 410 and at least one peg 290 during formation of wire harness 610.

Referring generally to FIG. 1 and particularly to, e.g., FIGS. 2A-2D, 3, 4, 5, 6, 7A-7B, 8A-8B, 9, 10, 11A-11B, 12, 13, 14, and 15, at least one first opening 180 is two or more first openings 180. Contoured surface 140 has first end 210 and second end 220. One of two or more first openings 180 is proximate first end 210 of contoured surface 140 and another of two or more first openings 180 is proximate second end 220 of contoured surface 140. The preceding subject matter of this paragraph characterizes example 13 of the present disclosure, wherein example 13 also includes the subject matter according to any one of examples 6-12, above.

One of two or more first openings 180 being proximate first end 210 of contoured surface 140 and another of two or more first openings 180 being proximate second end 220 of contoured surface 140 promotes proper conformance of wires 310 to guide 100 and facilitates the intended routing of wires 310. A desired wire curvature may be maintained and less wire creep relative to guide 100 may be observed.

Referring generally to FIG. 1 and particularly to, e.g., FIGS. 2A-2D, 3, 4, 5, 6, 7A-7B, 8A-8B, 10, 11A-11B, 12, 13, and 14, two or more first openings 180 are parallel to lines tangent to non-linear central axis 141. The preceding subject matter of this paragraph characterizes example 14 of the present disclosure, wherein example 14 also includes the subject matter according to example 13, above.

Two or more first openings 180 being parallel to a line tangent to non-linear central axis 141 (e.g., straight slots) enable positioning of straps 410 relative to guide 100 such that straps 410 can tightly secure wires 310 without excessive deformation of the straps. Furthermore, at least one first opening 180 being parallel to a line tangent to non-linear central axis 141 enables the use of straps 410 each approaching the width of first opening 180 to deliver a larger gripping surface.

Referring generally to FIG. 1 and particularly to, e.g., FIGS. 9 and 15, two or more first openings 180 are parallel to non-linear central axis 141. The preceding subject matter of this paragraph characterizes example 15 of the present disclosure, wherein example 15 also includes the subject matter according to example 13, above.

Two or more first openings 180 parallel to non-linear central axis 141 (e.g., curved slots) are well suited for use with straps 410 that are thin (e.g. cable ties) to enable a greater conformance of the straps to the wire bend and to promote tighter wrapping of wires 310 around the curves of guide 100, especially when two or more straps are used in conjunction with each first opening 180.

Referring generally to FIG. 1 and particularly to, e.g., FIGS. 2A-2D, 3, 4, 5, 6, 7A-7B, 8A-8B, 9, 10, 11A-11B, 12, 13, 14, and 15, guide 100 further comprises at least one peg 290 extending from at least one of first surface 120 or second surface 130. The preceding subject matter of this paragraph characterizes example 16 of the present disclosure, wherein example 16 also includes the subject matter according to any one of examples 6-15, above.

At least one peg 290 extending from at least one of first surface 120 or second surface 130 provides the capability to secure guide 100 to form board 510 or other structures during manufacturing, transportation, and/or installation of the wire harness. At least one peg 290, extending from at least one of first surface 120 or second surface 130, enables the use of form board 510 having only openings to receive two or more pegs 290 or openings to receive peg 290 and pegs to be received within openings 190 of the guide 100.

Referring generally to FIG. 1 and particularly to, e.g., FIGS. 2A-2D, 3, 4, 5, 6, 7A-7B, 8A-8B, 9, 10, 11A-11B, 12, 13, 14, and 15, at least one peg 290 is configured to be inserted into one of two or more second openings 190. The preceding subject matter of this paragraph characterizes example 17 of the present disclosure, wherein example 17 also includes the subject matter according to example 16, above.

At least one peg 290 being configured to be inserted into one of two or more second openings 190 provides the capacity to adjoin guide 100 to form board 510 or other structure with varying levels of mobility of guide 100 relative to the form board 510 such that in some instances, guide 100 may be able to at least temporarily rotate relative to form board 510 or other structure during manufacturing, transportation, and/or installation of the harness.

Referring generally to FIG. 1 and particularly to, e.g., FIGS. 2A-2D, 3, 4, 5, 6, 7A-7B, 8A-8B, 9, 10, 11A-11B, 12, 13, 14, and 15, at least one peg 290 is configured to be inserted into one of two or more second openings 190 with a clearance fit. The preceding subject matter of this paragraph characterizes example 18 of the present disclosure, wherein example 18 also includes the subject matter according to example 16, above.

At least one peg 290 being configured to be inserted into one of two or more second openings 190 with a clearance fit provides the capability of at least one peg 290 to rotate or slide freely within two or more second openings 190. For example, at least one peg 290 can be inserted into one of two or more second openings 190 to anchor guide 100 to form board 510 and can be removed from one of two or more second openings 190 to decouple guide 100 from form board 510 without the use of tools.

Referring generally to FIG. 1 and particularly to, e.g., FIGS. 2A-2D, 3, 4, 5, 6, 7A-7B, 8A-8B, 9, 10, 11A-11B, 12, 13, 14, and 15, guide 100 further comprises at least one discontinuity 150 formed in first surface 120, second surface 130, and contoured surface 140. The preceding subject matter of this paragraph characterizes example 19 of the present disclosure, wherein example 19 also includes the subject matter according to any one of examples 1-18, above.

At least one discontinuity 150 formed in first surface 120, second surface 130, and contoured surface 140 enables wires 310 to be secured to the guide 100 using various shapes and sizes of bundle ties 320 (i.e., connectors, fasteners, cable ties etc.) after wires 310 are conformed to the guide 100, with minimal or no strain of wires 310.

At least discontinuity 150 may take any shape that enables accommodation of bundle ties 320. For example, at least discontinuity 150 may include one or more notches, grooves, notches joined by smaller grooves, etc.

Referring generally to FIG. 1 and particularly to, e.g., FIGS. 2A-2D, 3, 4, 5, 6, 9, 10, 11A-11B, 12, 13, 14, and 15, each one of at least one discontinuity 150 has central axis 151 substantially perpendicular to first portion 122 of first surface 120, to second portion 132 of second surface 130, and to non-linear central axis 141 of contoured surface 140. The preceding subject matter of this paragraph characterizes example 20 of the present disclosure, wherein example 20 also includes the subject matter according to example 19, above.

Each discontinuity 150, having central axis 151 substantially perpendicular to first portion 122 of first surface 120, to second portion 132 of second surface 130, and to non-linear central axis 141 of contoured surface 140, promotes orientation of bundle ties 320 relative to wires 310 intended to insure that the bundle ties 320 positively grip wires 310 without slipping. In other words, creep of the bundle ties 320 relative to the wires is reduced, promoting the integrity of the assembly of wires 310.

Referring generally to FIG. 1 and particularly to, e.g., FIGS. 2A-2D, 3, 5, 6, 11A-11B, 12, and 13, each one of at least one discontinuity 150 comprises groove 160 that fully interrupts contoured surface 140. The preceding subject matter of this paragraph characterizes example 21 of the present disclosure, wherein example 21 also includes the subject matter according to any one of examples 19 and 20, above.

Groove 160 that fully interrupts contoured surface 140 enables installation of bundle ties 320 after conforming wires 310 to guide 100 such that the desired bend of wires 310 around contoured surface 140 is maintained and without straining wires 310.

Referring generally to FIG. 1 and particularly to, e.g., FIGS. 2A-2D, 3, 4, 5, 9, 10, 11A-11B, 12, and 13, at least one discontinuity 150 is three or more discontinuities 150 spaced at intervals X along contoured surface 140 of guide 100. The preceding subject matter of this paragraph characterizes example 22 of the present disclosure, wherein example 22 also includes the subject matter according to example 21, above.

Three or more discontinuities 150 spaced at intervals X along contoured surface 140 enable installation of a specified number of bundle ties 320 around wires 310 without excessively straining wires 310 so that the wires are held securely together and the desired bend of wires 310 around contoured surface 140 of guide 100 is maintained. Additionally, wire creep is reduced and wires 310 are better protected from wear and tear.

Referring generally to FIG. 1 and particularly to, e.g., FIGS. 2A-2D, 3, 4, 5, 9, 10, 11A-11B, 12, and 13, intervals X are identical to each other. The preceding subject matter of this paragraph characterizes example 23 of the present disclosure, wherein example 23 also includes the subject matter according to example 22, above.

Intervals X being identical to each other provides proper positioning and balanced support to bundle ties 320, wires 310, and guide 100, so that strain is reduced and desired wire bend is maintained. Referring, e.g., to FIG. 6, in other examples, the intervals may be of different lengths, and therefore not identical. Thus, in some examples, variation of the intervals can enable customization and weight balancing/distribution with respect to wires 310 and guide 100.

Referring generally to FIG. 1 and particularly to, e.g., FIGS. 3 and 4, each one of at least one discontinuity 150 comprises first notch 162 and second notch 164. First notch 162 and second notch 164 partially interrupt contoured surface 140. The preceding subject matter of this paragraph characterizes example 24 of the present disclosure, wherein example 24 also includes the subject matter according to any one of examples 19-20, above.

First notch 162 and second notch 164 partially interrupting contoured surface 140 enable installation of bundle ties 320 after conforming wires 310 to guide 100 such that the desired bend of wires 310 around contoured surface 140 of guide 100 is maintained and without excessively straining wires 310.

Referring generally to FIG. 1 and particularly to, e.g., FIG. 3, at least one discontinuity 150 further comprises groove 160, fully interrupting first notch 162, second notch 164, and contoured surface 140. The preceding subject matter of this paragraph characterizes example 25 of the present disclosure, wherein example 25 also includes the subject matter according to example 24, above.

Groove 160 fully interrupting first notch 162, second notch 164, and contoured surface 140 protects bundle ties 320, wires 310, and guide 100 by reducing strain of the wires and promoting a desired bend of wires 310. Referring, e.g., to FIG. 6, in other instances, the grooves may be of different depths, and therefore not identical. Thus, in some examples, variation in grooves can enable customization to the shapes of bundle ties 320 and balancing of strain on wires 310 and guide 100.

Referring generally to FIG. 1 and particularly to, e.g., FIGS. 2A-2D, 3, 4, 5, 6, 9, 10, 11A-11B, 12, 13, 14, and 15, guide 100 further comprises a polymeric material. The preceding subject matter of this paragraph characterizes example 26 of the present disclosure, wherein example 26 also includes the subject matter according to any one of examples 1-25, above.

Use of a polymeric material to form guide 100 decreases weight and the associated cost of manufacturing of the guide. Furthermore, the transportation cost of wire harness 610 is reduced and ease of installation increased.

Polymeric materials may include, but are not limited to, various plastics, individually or in combination, such as polyurethanes, polyesters, epoxy resins, phenolic resins, polyethylene, polypropylene, polyvinyl chloride, polyethylene terephthalate, or polytetrafluoroethylene. It is noted that in some examples guide 100 may be made of polymeric material(s) in addition to other (e.g., non-polymeric) materials.

Referring generally to FIG. 1 and particularly to, e.g., FIG. 15, system 1000, comprising guide 100 and wire harness 610, is disclosed. Guide 100 comprises first surface 120 and second surface 130, at least second portion 132 of which is parallel to at least first portion 122 of first surface 120. Guide 100 further comprises contoured surface 140 between first surface 120 and second surface 13 as well as plurality of through, circumferentially enclosed openings 170, extending from first surface 120 to second surface 130. Contoured surface 140 has non-linear central axis 141, parallel to at least first portion 122 of first surface 120 and to at least second portion 132 of second surface 130. Contoured surface 140 also has concave cross-section 142. Wire harness 610 comprises wires 310 that are routed along contoured surface 140 of guide 100. The preceding subject matter of this paragraph characterizes example 27 of the present disclosure.

Contoured surface 140 provides frame support upon which wires 310 of wire harness 610 may be positioned such that a particular desired harness configuration (i.e., bend radius or curvature of wires 310) is maintained during manufacturing, transportation, and installation of wires 310 (or system 1000). Contoured surface 140 resists lateral displacement of wires 310 (e.g., from one side of guide 100 that is closer to first surface 120 to another side of guide 100 that is closer to second surface 130).

Parallel first and second portions 122, 132 of first and second surfaces 120, 130 provide planar alignment of guide 100 with a flat surface, such as that of form board 510. Such planar alignment is important for aligning wires 310 when multiple guides 100 are coupled to form board 510, or another structure, to route wires 310. Advantageously, correct manufacturing, transportation, and/or installation of system 1000 is achieved according to design parameters and specifications.

Non-linear central axis 141 is coincident to at least first portion 122 of first surface 120 and to at least second portion 132 of second surface 130 and follows the bend or curvature in which wires 310 of wire harness 610 are positioned.

Plurality of through, circumferentially enclosed openings 170 provides different arrangements to secure wires 310 to guide 100 and/or to secure guide 100 to a flat surface, such as that of form board 510.

Referring generally to FIG. 1 and particularly to, e.g., FIG. 15, guide 100 further comprises one or more discontinuities 150 formed in first surface 120, second surface 130, and contoured surface 140. The preceding subject matter of this paragraph characterizes example 28 of the present disclosure, wherein example 28 also includes the subject matter according to example 27, above.

At least one discontinuity 150 formed in first surface 120, second surface 130, and contoured surface 140 enables wires 310 to be secured to the guide 100 using various shapes and sizes of bundle ties 320 (i.e., connectors, fasteners, cable ties etc.) after wires 310 are conformed to the guide 100, with minimal or no strain of wires 310.

Referring generally to FIG. 1 and particularly to, e.g., FIG. 15, system 1000 further comprises at least one bundle tie 320, each configured to pass through one of one or more discontinuities 150 underneath wires 310 of wire harness 610 to secure wires 310 of wire harness 610 together. The preceding subject matter of this paragraph characterizes example 29 of the present disclosure, wherein example 29 also includes the subject matter according to example 28, above.

At least one bundle tie 320 being configured to pass through one of discontinuities 150 underneath wires 310 of wire harness 610 to secure wires 310 of wire harness 610 together enables wires 310 to be securely fastened so a desired wire bend is maintained.

Referring generally to FIG. 1 and particularly to, e.g., FIG. 15, system 1000 further comprises at least one strap 410, configured to pass through at least one of plurality of through, circumferentially enclosed openings 170, to secure wire harness 610 to guide 100. The preceding subject matter of this paragraph characterizes example 30 of the present disclosure, wherein example 30 also includes the subject matter according to any one of examples 27-29, above.

At least one strap 410 passing through at least one through, circumferentially enclosed opening 170 to secure wire harness 610 to guide 100 enables wires 310 to be securely fastened to system 1000, maintain desired wire bend, and promote reduced wire creep.

In one or more examples, at least one strap 410 may be made of any material or fabric used in manufacturing, transportation, and/or installation of bend radius wire harness guides.

Referring generally to FIG. 1 and particularly to, e.g., FIGS. 14, 15, and 16 (blocks 1601, 1602), method 2000 of forming wire harness 610 is disclosed. Method 2000 comprises coupling guide 100 to form board 510 such that non-linear central axis 141 of contoured surface 140 of guide 100 is parallel to form board 510 and guide 100 is not rotatable relative to form board 510. Method 2000 also comprises routing wires 310 along contoured surface 140 of guide 100 to form a bend in wires 310. The preceding subject matter of this paragraph characterizes example 31 of the present disclosure.

Non-linear central axis 141 being parallel to form board 510 prevents interference of form board 510 in the formation and positioning of wire harness 610 and promotes the intended exact placement of wires 310 per customized specifications. Restricting guide 100 from rotating relative to form board 510 allows guide 100 to be affixed such that the placement of wires 310 and wire harness 610 is maintained according to design specifications.

As used herein, guide 100 being "not rotatable" relative to form board 510 means that guide 100 is restricted from rotation relative to form board 510 within manufacturing tolerance. It is to be understood that excessive amounts of force, such as amounts outside of manufacturing tolerance, may nonetheless result in guide 100 rotating relative to form board 510.

Referring generally to FIG. 1 and particularly to, e.g., FIGS. 14, 15, and 16, guide 100 is coupled to form board 510 by coupling at least two pegs 290 to both guide 100 and form board 510. The preceding subject matter of this paragraph characterizes example 32 of the present disclosure, wherein example 32 also includes the subject matter according to example 31, above.

Use of at least two pegs 290 to couple guide 100 to form board 510 provides proper alignment and positioning of guide 100 and wires 310 relative to form board 510 during manufacturing, transportation, and/or installation.

Referring generally to FIG. 1 and particularly to, e.g., FIGS. 14, 15, and 16 (block 1603), method 2000 further comprises routing bundle tie 320 between wires 310 of wire harness 610 and contoured surface 140 of guide 100 through discontinuities 150 formed in first surface 120 of guide 100, second surface 130 of guide 100, and contoured surface 140 of guide 100. Additionally, method 2000 comprises securing wires 310 together with bundle tie 320. The preceding subject matter of this paragraph characterizes example 33 of the present disclosure, wherein example 33 also includes the subject matter according to any one of examples 31 or 32, above.

Routing and securing bundle tie(s) 320 provides proper alignment, positioning, and support of wires 310 of wire harness 610 during manufacturing, transportation, and/or installation.

Referring generally to FIG. 1 and particularly to, e.g., FIGS. 14, 15, and 16 (block 1604 and 1605), method 2000 further comprises securing wire harness 610 to guide 100 using one or more straps 410, each routed through one of plurality of through, circumferentially enclosed openings 170 extending from first surface 120 of guide 100 to second surface 130 of guide 100. Method 2000 also comprises decoupling guide 100 from form board 510 together with wire harness 610, secured to guide 100. The preceding subject matter of this paragraph characterizes example 34 of the present disclosure, wherein example 34 also includes the subject matter according to any one of examples 31-33, above.

Utilizing straps 410 to secure wire harness 610 to guide 100 provides proper alignment, positioning, and support for wire harness 610 during manufacturing, transportation, and/or installation. Decoupling wire harness 610 and guide 100 from form board 510, once wire harness 610 and guide 100 are secure, enables transportation of wire harness 610, guide 100, and wires 310, and enables use of form board 510 to be used in forming another wire harness 610.

Each of the processes of illustrative method 2000 may be performed or carried out by a system integrator, a third party, and/or an operator (e.g., a customer). For the purposes of this description, a system integrator may include, without limitation, any number of manufacturers and major-system subcontractors; a third party may include, without limitation, any number of vendors, subcontractors, and suppliers; and an operator may be an leasing company, military entity, service organization, and so on. Thus, in some examples, processes of illustrative method 2000 may be automated by manufacturing equipment or machinery.

Apparatus(es) and method(s) shown or described herein may be employed during any one or more of the stages of the manufacturing, transportation, and installation of wires and wire harnesses and method 2000.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be

The invention claimed is:

1. A guide for a wire harness, the guide comprising:
a first surface;
a second surface, at least a second portion of which is parallel to at least a first portion of the first surface;
a contoured surface between the first surface and the second surface, wherein the contoured surface has a non-linear central axis parallel to at least the first portion of the first surface and to at least the second portion of the second surface, wherein the non-linear central axis is curved, and wherein the contoured surface has a curved concave cross-section for receiving one or more wires; and
a plurality of through, circumferentially enclosed openings extending from the first surface to the second surface.

2. The guide according to claim 1, wherein the non-linear central axis forms a closed shape.

3. The guide according to claim 1, wherein the non-linear central axis forms an open shape.

4. The guide according to claim 1, wherein:
the plurality of through, circumferentially enclosed openings comprises at least one first opening and two or more second openings,
the at least one first opening has a first cross-sectional shape in a plane containing the non-linear central axis,
the two or more second openings each having a second cross-sectional shape in the plane containing the non-linear central axis, and
the first cross-sectional shape is different from the second cross-sectional shape.

5. The guide according to claim 4, wherein the first cross-sectional shape of the at least one first opening is an elongated shape.

6. The guide according to claim 4, wherein the second cross-sectional shape of each of the two or more second openings is a circular shape.

7. The guide according to claim 4, wherein the at least one first opening is parallel to a line tangent to the non-linear central axis.

8. The guide according to claim 4, wherein the at least one first opening is parallel to the non-linear central axis.

9. The guide according to claim 4, wherein at least a portion of the at least one first opening is closer to the non-linear central axis than at least a portion of any one of the two or more second openings.

10. The guide according to claim 4, wherein all portions of the at least one first opening are closer to the non-linear central axis than all portions of any one of the two or more second openings.

11. The guide according to claim 4, further comprising at least one peg extending from at least one of the first surface or the second surface.

12. The guide according to claim 11, wherein the at least one peg is configured to be inserted into one of the two or more second openings with a clearance fit.

13. A guide for a wire harness, the guide comprising:
a first surface;
a second surface, at least a second portion of which is parallel to at least a first portion of the first surface;
a contoured surface between the first surface and the second surface, wherein the contoured surface has a non-linear central axis parallel to at least the first portion of the first surface and to at least the second portion of the second surface, and wherein the contoured surface has a curved concave cross-section for receiving one or more wires;
at least one discontinuity formed in the contoured surface; and
a plurality of through, circumferentially enclosed openings extending from the first surface to the second surface.

14. The guide according to claim 13, further comprising at least one discontinuity formed in the first surface, or the second surface.

15. The guide according to claim 14, wherein each one of the at least one discontinuity has a central axis substantially perpendicular to the first portion of the first surface, to the second portion of the second surface, and to the non-linear central axis of the contoured surface.

16. The guide according to claim 14, wherein each one of the at least one discontinuity comprises a groove that fully interrupts the contoured surface.

17. The guide according to claim 16, wherein the at least one discontinuity comprises three or more discontinuities spaced at intervals along the contoured surface of the guide.

18. The guide according to claim 17, wherein the intervals are identical to each other.

19. The guide according to claim 13, further comprising a polymeric material.

20. The guide according to claim 13, wherein the non-linear central axis comprises an inflection point.

* * * * *